United States Patent [19]
Frei et al.

[11] Patent Number: 5,755,393
[45] Date of Patent: May 26, 1998

[54] BELT RETRACTOR AND A METHOD FOR THE ASSEMBLY THEREOF

[75] Inventors: Bernhard Frei, Waldstetten; Andreas Huber, Durlangen, both of Germany

[73] Assignee: TRW Occupant Restraint Systems GmbH, Alfdorf, Germany

[21] Appl. No.: 872,962

[22] Filed: Jun. 11, 1997

[30] Foreign Application Priority Data

Jun. 13, 1996 [DE] Germany .................. 196 23 658.4

[51] Int. Cl.$^6$ .................. B60R 22/44; F03G 1/08; B23P 11/00
[52] U.S. Cl. .................. 242/372; 242/375.2; 29/418; 29/446
[58] Field of Search .................. 242/372, 375.2; 280/807; 185/37, 45; 29/418, 446

[56] References Cited

U.S. PATENT DOCUMENTS

| | | |
|---|---|---|
| 4,159,809 | 7/1979 | Rawson .................. 242/375.2 |
| 5,314,137 | 5/1994 | Fujimura et al. .................. 242/375.2 |
| 5,316,233 | 5/1994 | Hiramatsu . | |
| 5,452,862 | 9/1995 | Ray .................. 242/372 |

*Primary Examiner*—John M. Jillions
*Attorney, Agent, or Firm*—Tarolli, Sundheim, Covell, Tummino & Szabo

[57] ABSTRACT

A belt retractor is provided which comprises a housing, a belt drum mounted in the housing so as to be rotatable about an axis of rotation, and a spring drive for the belt drum. The spring drive comprises an output drive part connected with the belt drum in such a manner as to prevent relative rotation, an intermediate part arranged rotatably in relation to the belt drum and to the housing and being centered on the axis of rotation of the belt drum, a wind-up spring effective between the housing and the intermediate part, an auxiliary spring effective between the intermediate part and the output drive part, and a spring cover. The spring cover and the output drive part are provided with receiving means coaxial to the belt drum and having interlocking means for a pin. The pin is simultaneously engageable with both of the receiving means in such a manner as to prevent relative rotation. The intermediate part is rotatably mounted on the pin. Furthermore, a method for mounting the spring drive of a belt retractor to the belt retractor is provide.

10 Claims, 4 Drawing Sheets

BELT RETRACTOR AND A METHOD FOR THE ASSEMBLY THEREOF

FIELD OF THE INVENTION

The invention relates to a belt retractor for an vehicle occupant restraint system.

BACKGROUND OF THE INVENTION

A conventional belt retractor comprises a housing, a belt drum rotatably mounted in said housing, and a spring drive for the belt drum, said spring drive having an output drive part connected with the belt drum in such a manner as to prevent relative rotation, a spring cover, an intermediate part arranged rotatably in relation to the belt drum and to the housing and being centered on the axis of rotation of the belt drum, a wind-up spring effective between the housing and the intermediate part, and an auxiliary spring effective between the intermediate part and the output drive part.

In the case of such a belt retractor, which is also known as "comfort belt retractor", there is a difficulty to the extent that during assembly both the auxiliary spring and also the wind-up spring, which is stronger dimensioned as the auxiliary spring, must be pre-tensioned when the belt drum is connected with the spring drive of the belt retractor.

BRIEF SUMMARY OF THE INVENTION

The invention is to provide a belt retractor whose spring drive may be pre-tensioned in a particularly simple fashion. For this purpose, a belt retractor is provided which comprises a housing, a belt drum mounted in the housing so as to be rotatable about an axis of rotation, and a spring drive for the belt drum. The spring drive comprises an output drive part connected with the belt drum in such a manner as to prevent relative rotation, an intermediate part arranged rotatably in relation to the belt drum and to the housing and being centered on the axis of rotation of the belt drum, a wind-up spring effective between the housing and the intermediate part, an auxiliary spring effective between the intermediate part and the output drive part, and a spring cover. The spring cover and the output drive part are provided with receiving means coaxial to the belt drum and having interlocking means for a pin. The pin is simultaneously engageable with both of the receiving means in such a manner as to prevent relative rotation. The intermediate part is rotatably mounted on the pin.

The invention is furthermore to provide a method with which the spring drive of the belt retractor can be pre-tensioned with minimum complexity. For this purpose a method for the assembly of a belt retractor is provided, which requires a belt retractor comprising a housing, a belt drum mounted in the housing so as to be rotatable about an axis of rotation, and a spring drive for the belt drum. The spring drive comprises an output drive part connected with the belt drum in such a manner as to prevent relative rotation, an intermediate part arranged rotatably in relation to the belt drum and to the housing and being centered on the axis of rotation of the belt drum, a wind-up spring effective between the housing and the intermediate part, an auxiliary spring effective between the intermediate part and the output drive part, and a spring cover. The spring drive of the belt retractor is completely pre-assembled separately from the rest of the belt retractor as follows: First, a pin is inserted into the output drive part of the spring drive. Second, the pin is rotated until the auxiliary spring and the wind-up spring of the spring drive are pre-tensioned. Then, the pin is further inserted into the spring drive until it so fits into a receiving means in the spring cover that the output drive part is held in such a manner as to prevent rotation in relation to the spring cover. Finally, the spring drive is mounted on the belt retractor, this leading to the pin being thrust out of the output drive part and further into the receiving means in the spring cover, while simultaneously the belt drum is connected with the output drive part of the spring drive.

The pin inserted into the spring drive during pre-assembly thereof accordingly performs three functions simultaneously: it serves as a tensioning tool for tensioning the spring drive, it serves as an anchoring means to lock the output drive part in relation to the spring cover, when the spring drive has been pre-tensioned, and it finally serves as a bearing element for the intermediate part, when it is completely inserted into its receiving means in the spring cover. Accordingly there is, generally speaking, a particularly simple assembly of a belt retractor in accordance with the invention.

In the case of a preferred embodiment of a belt retractor in accordance with the invention it is provided that the pin has a peripheral groove on its end inserted into the receiving means in the spring cover, and furthermore that the receiving means of the output drive part and of the spring cover are provided with an internally projecting bead. It is furthermore possible for the distance between the bead of the receiving means of the output drive part and the end face of the output drive part, adjacent the intermediate part, to be the same as the distance between the peripheral groove in the pin and the end face at the end of the pin. Furthermore it is possible for the distance between the bead of the receiving means of the output drive part and the bead of the receiving means of the spring cover to be the same as the length of the pin. Finally it is possible for the distance between the bead of the receiving means of the spring cover and the end face of the intermediate part, adjacent the belt drum, to be equal to the distance between the peripheral groove in the pin and the end face at the second end of the pin. In such a design the different settings of the pin in relation to the spring drive which are necessary for proper tensioning of the spring drive and for following fitting of the spring drive to the belt drum, are set with maximum convenience: A tensioning position with the pin completely inserted into the receiving part of the output drive part, an intermediate fitting position, in which the pin fits both into the receiving means in the output drive part and also in the receiving means in the spring cover holding such two parts in such a manner as to prevent relative rotation so that the auxiliary spring and the wind-up spring remain tensioned, and a operational position, in which the pin is separated from the output drive part so that the auxiliary spring and the windup spring may act via the output drive part on the belt drum connected with same.

Preferably the pin is integrally injection cast with the output drive part, the material connection between the pin and the output drive part being broken when the pin is pushed into the output drive part. This design provides that pre-tensioning the spring drive is even further simplified.

Further advantageous developments of a belt retractor of the invention will be gathered from the dependent claims.

BRIEF DESCRIPTION OF THE DRAWING

Details of the invention will be seen from the following description embodiment as illustrated in the drawings.

DETAILED DESCRIPTION OF THE INVENTION

Figure 4:
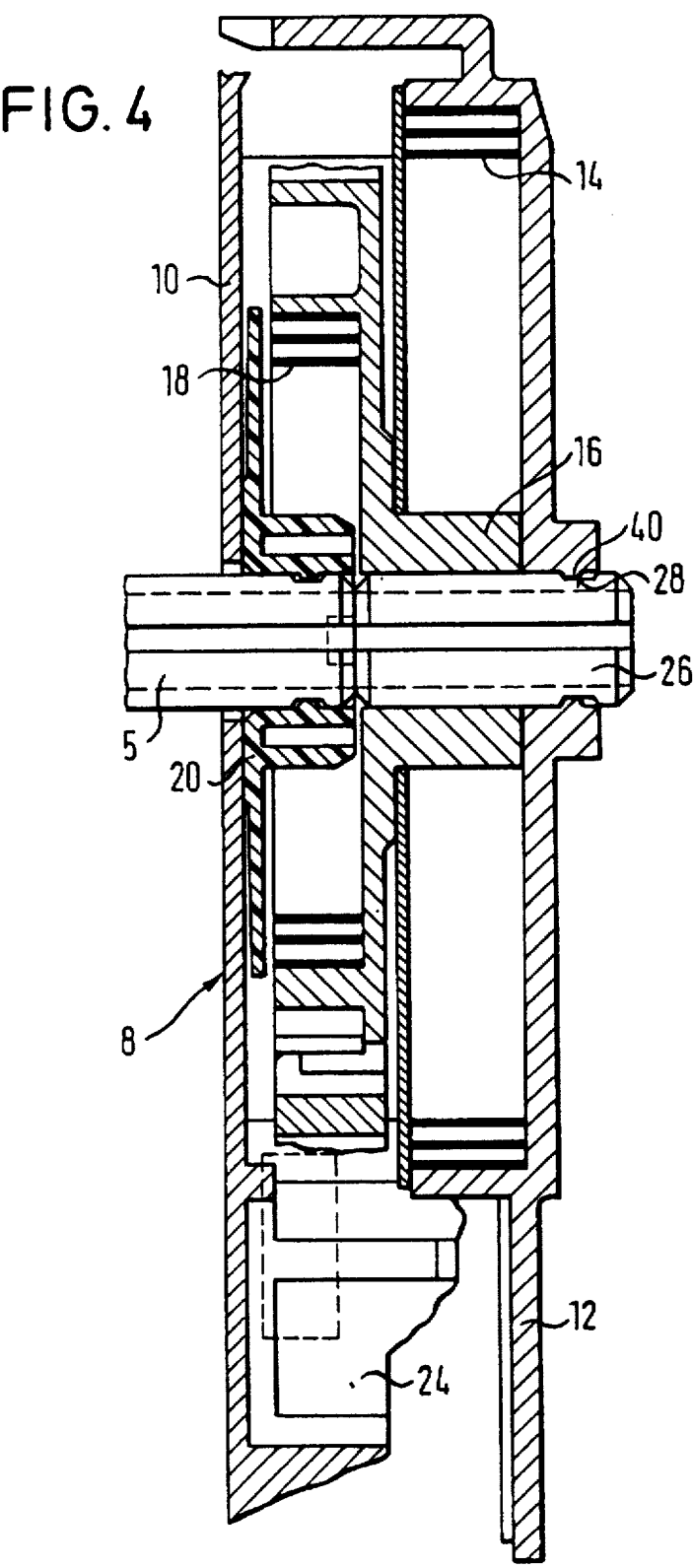
FIG. 4 shows the spring drive of FIG. 1 in an operational state.

FIGS. 1 through 4 show a preferred embodiment of a spring drive as utilized in a belt retractor in accordance with the invention. The belt retractor comprises as its principal parts a housing, in which a belt drum is mounted for rotation therein, and a locking mechanism with which the belt drum may be locked responsive to the vehicle and/or the belt webbing. In order to render the drawing more straightforward the only part of this belt retractor illustrated in FIG. 4 is a drive head 5 permanently connected with the belt drum. The belt retractor furthermore comprises a spring drive 8 which acts on the belt drum of the belt retractor in the belt webbing wind-up direction via the drive head 5.

The spring drive 8 comprises a holding plate 10 and a spring cover 12, in whose interior space a wind-up spring 14, an intermediate part 16 which is able to be turned in relation to the belt drum and to the housing 10 and is centered on the axis of rotation of the belt drum, an auxiliary spring 18 and an output drive part 20 are arranged. The output drive part 20 is connected with the drive head 5 of the belt drum (FIG. 4) in such a manner as to prevent relative rotation. The outer end of the wind-up spring 14 is secured in the spring cover 12, whereas the inner end of the wind-up spring 14 is secured to the intermediate part 16. The outer end of the auxiliary spring 18 for its part is secured to the intermediate part 16, whereas the inner end of the auxiliary spring is secured to the output drive part 20. Such a spring drive may be utilized to realize a "comfort function", in which, when the belt webbing is put on, the wind-up force for the belt webbing acting on the belt drum is reduced. For this purpose it is possible for the intermediate part to be immobilized by means of a diagrammatically illustrated locking device 24 so that only the force of the auxiliary spring, which is dimensioned weaker than the wind-up spring, acts on the belt drum. Such a belt drum is known. In what follows only the design and assembly of a spring drive for or, respectively, on such a belt retractor will be described.

Figure 1:
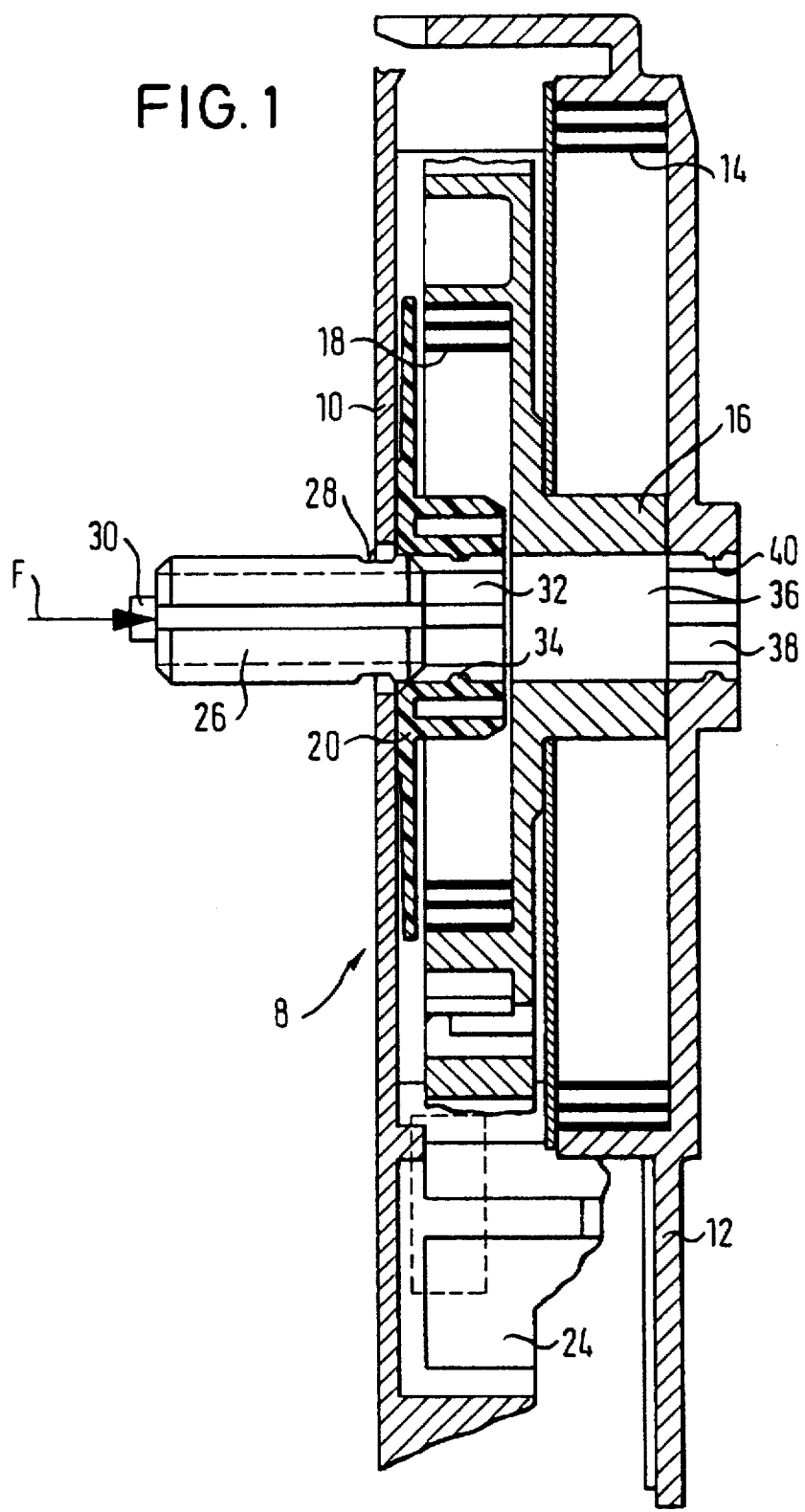
FIG. 1 diagrammatically shows a spring drive of a belt retractor of the invention in an initial position.
Figure 2:
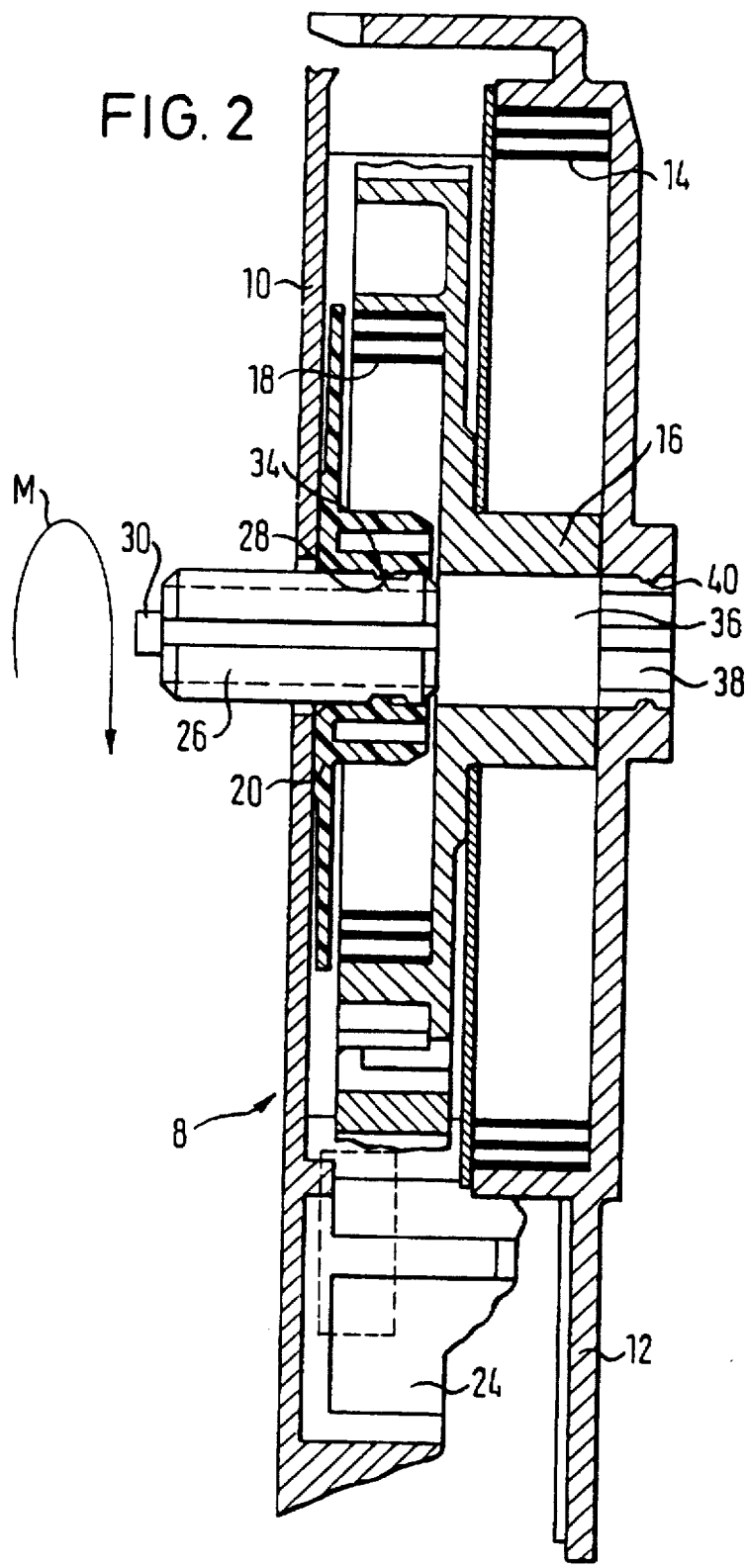
FIG. 2 shows the spring drive of FIG. 1 in a tensioning state.
Figure 3:
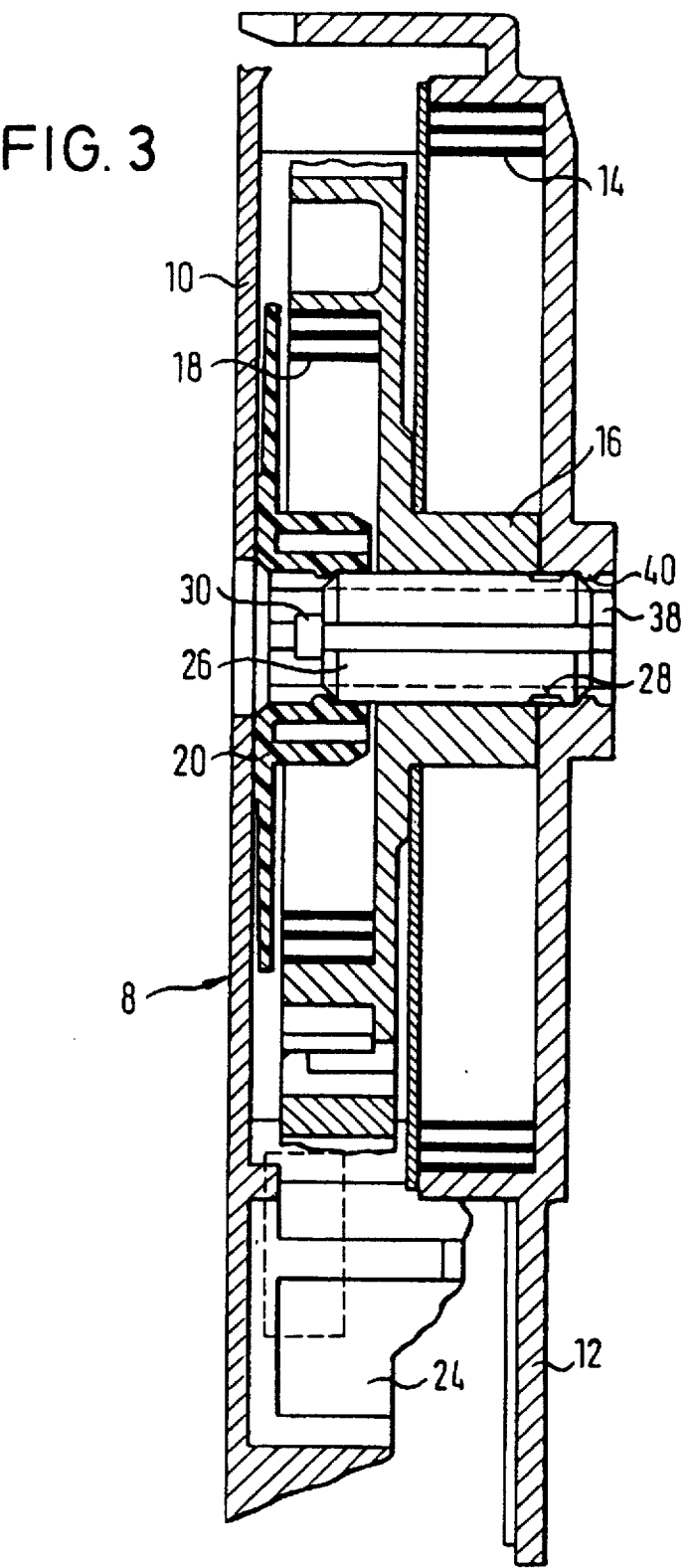
FIG. 3 illustrates the spring drive in accordance with FIG. 1 in an intermediate state of assembly.

In FIG. 1 the initial condition of such a spring drive 8 is indicated. A pin 26 is integrally molded on the output drive part 20 and is formed as a splined shaft. At its end which is to the right in terms of the figures, the pin 26 is provided with a peripheral groove 28, and on the end face of its second end opposite to the above mentioned end it is provided with a bearing head 30. The output drive part 20 has a receiving means 32 for the pin 26, which is centered on the axis of rotation of the belt drum and is provided with a splined outline complementary to the splined cross section of the pin 26. An inwardly extending bead 34 is formed in the interior of the receiving means 32. The spring cover 12 is also provided with a receiving means 38 centered on the axis of rotation of the belt drum, such receiving means 38, like the receiving means 32, also being provided with a splined outline complementary to the splines of the pin 26 and possessing an inwardly projecting bead 40. The intermediate part 16 is provided with a hole 36 centered on the axis of rotation of the belt drum, such hole having a smooth bore of a diameter which is slightly larger than the external diameter of the pin 26.

Owing to the above described design, the spring drive 8 is able to be fitted in position as such independently of the belt drum. Firstly the pin 26 molded on the output drive part 20 is detached from the output drive part. For this purpose the pin 26 is subjected to a force directed along the arrow F, such force breaking the thin-walled injection molding links between the output drive part 20 and the pin 26. The pin 26 is then thrust inward into the output drive part 20 as far as into the tensioning position depicted in FIG. 2. In this tensioning position the pin 26 is secured in place by the bead 34 engaging into the peripheral groove 28. Owing to a moment M applied to the pin 26, now serving as a tensioning tool, the auxiliary spring 18 and the wind-up spring 14 are pre-tensioned to the desired extent. The locking mechanism 24 is put out of action on tensioning the wind-up spring 14 and the auxiliary spring 18.

When the desired degree of pre-tensioning has been reached in the auxiliary spring 18 and the wind-up spring 14, the pin 26 is further thrust in the direction of the arrow F into the spring drive until the pin 26 fits into the receiving means 38 in the spring cover 12. At this time the pin 26 is still connected with the output drive part 20 (FIG. 2) in such a manner as to prevent relative rotation. In this intermediate position of assembly, the pin 26 is fixed between the bead 34 of the receiving means 32 of the output drive part and the bead 40 of the receiving means 38 of the spring part 12. Owing to the connection preventing relative rotation between the pin 26 and the receiving means 32 and 38, the output drive part 20 is held so that rotation thereof in relation to the spring cover 12 is prevented and the auxiliary spring 18 and the wind-up spring 14 remain pre-tensioned. The spring drive is now completely pre-assembled.

When the spring drive pre-assembled in this manner is fitted to a belt retractor, the output drive part 20 is slipped onto the drive head of the belt drum. The drive head 5 thrusts the pin 26 further into the spring drive until it leaves the receiving means 32 of the output drive part 20 and is essentially flush with the end face of the intermediate part 16 (FIG. 4), adjacent the belt drum. In this operational position the output drive part 20 is connected with the belt drum in such a manner as to prevent relative rotation, while however being able to turn freely in relation to the spring cover 12. In this operational position of the spring drive the pin 26 merely serves for rotatably supporting the intermediate part 16 and for shutting off the spring drive from the outside, since the opening formed by the receiving means 38 in the spring cover 12 is permanently closed by the inserted pin 26. In this position the pin 26 is held in place by the bead 40 engaging into its peripheral groove 28. Owing to its bearing head 30 fitting into a corresponding bearing recess in the drive head 5, the pin 26 is rotatably supported at either end.

A significant feature of the invention is consequently that the pin 26 performs different functions simultaneously, namely the function of a tensioning tool for tensioning the auxiliary spring 18 and the wind-up spring 14, of a securing element for holding the auxiliary spring 18 and the wind-up spring 14 in the pre-tensioned condition, and the function of a bearing element for the intermediate element. Furthermore the pin 26 performs the function of a closure element for the spring cover 16. It is to be emphasized that the different functions of the pin and the correlated position in the interior of the spring drive are promoted by the particular arrangement of the peripheral groove in the pin and of the beads of the receiving means of the output drive part and in the spring cover.

We claim:

1. A belt retractor comprising a housing, a belt drum mounted in said housing so as to be rotatable about an axis of rotation, and a spring drive for said belt drum, said spring drive having an output drive part connected with said belt drum in such a manner as to prevent relative rotation, an intermediate part arranged rotatably in relation to said belt drum and to said housing and being centered on said axis of rotation of said belt drum, a wind-up spring effective between said housing and said intermediate part, an auxiliary spring effective between said intermediate part and said output drive part, and a spring cover, said spring cover and said output drive part being provided with receiving means coaxial to said belt drum and having interlocking means for a pin, said pin being simultaneously engageable with both of said receiving means in such a manner as to prevent relative rotation, said intermediate part being rotatably mounted on said pin.

2. The belt retractor of claim 1, wherein said pin is formed as a splined shaft with external splines and wherein said receiving means of said spring cover and of said output drive part are provided with a splined outline complementary to said splines of said pin.

3. The belt retractor of claim 1, wherein said pin has an end adapted for insertion into said receiving means of said spring cover and said pin is provided with a peripheral groove on said end, and wherein said receiving means in said output drive part and in said spring cover are each provided with an inwardly projecting bead.

4. The belt retractor of claim 3, wherein said output drive part has an end face adjacent said intermediate part and said pin has an end face at said end adapted for insertion into said receiving means of said spring cover, and wherein the distance between said bead in said receiving means in said output drive part and said end face of said output drive part is the same as the distance between said peripheral groove in said pin and said end face at said pin end.

5. The belt retractor of claim 3, wherein the distance between said bead in said receiving means in said output drive part and said bead in said receiving means in said spring cover is the same as the length of said pin.

6. The belt retractor of claim 3, wherein said intermediate part has an end face adjacent said belt drum and said pin has an end face at a second end opposite said first pin end, and wherein the distance between said bead in said receiving means in said spring cover and said end face of said intermediate part is the same as the distance between said peripheral groove in said pin and said end face at said second pin end.

7. The belt retractor of claim 1, wherein said second pin end is provided with a bearing head extending in said axial direction, and wherein said belt drum has an end adjacent said output drive part, said end of said belt drum being provided with a bearing recess complementary to said bearing head.

8. The belt retractor of claim 1, wherein said receiving means in said spring cover is open to the outside of said spring cover.

9. A method for the assembly of a belt retractor comprising a housing, a belt drum mounted in said housing so as to be rotatable about an axis of rotation, and a spring drive for said belt drum, said spring drive having an output drive part connected with said belt drum in such a manner as to prevent relative rotation, an intermediate part arranged rotatably in relation to said belt drum and to said housing and being centered on said axis of rotation of said belt drum, a windup spring effective between said housing and said intermediate part, an auxiliary spring effective between said intermediate part and said output drive part, and a spring cover, wherein said spring drive of said belt retractor is completely pre-assembled separately from the rest of said belt retractor as follows:

a) inserting a pin into said output drive part of said spring drive, b) rotating said pin until said auxiliary spring and said wind-up spring of said spring drive are pre-tensioned, c) further inserting said pin into said spring drive until it so fits into a receiving means in said spring cover that said output drive part is held in such a manner as to prevent rotation in relation to said spring cover, and then mounting said spring drive on said belt retractor, said pin being thrust out of said output drive part and further into said receiving means in said spring cover, while simultaneously said belt drum is connected with said output drive part of said spring drive.

10. The method of claim 9, wherein said pin is injection cast integrally with said output drive part so that said pin is connected with said output drive part by means of a material connection, and wherein the method further comprises breaking said material connection by inserting said pin into said output drive part.

\* \* \* \* \*